United States Patent [19]

Biermeier et al.

[11] Patent Number: 4,692,827
[45] Date of Patent: Sep. 8, 1987

[54] DIVIDED HOUSING FOR A MAGNETIC DISK DRIVE COMPRISING A PERIPHERAL SEALING RING

[75] Inventors: Johann Biermeier, Munich; Heinz Obermayer, Grafrath, both of Fed. Rep. of Germany

[73] Assignee: Siemens Aktiengesellschaft, Berlin and Munich, Fed. Rep. of Germany

[21] Appl. No.: 696,204

[22] Filed: Jan. 29, 1985

[30] Foreign Application Priority Data

Feb. 7, 1984 [DE] Fed. Rep. of Germany ....... 3404241

[51] Int. Cl.$^4$ ............................................. G11B 00/00
[52] U.S. Cl. ...................................... 360/97; 360/137
[58] Field of Search ..................................... 360/97–99, 360/137

[56] References Cited

U.S. PATENT DOCUMENTS

| 3,465,875 | 9/1969 | McKelvey, Jr. et al. | 206/62 |
| 4,054,931 | 10/1977 | Bolton et al. | 360/97 |
| 4,307,425 | 12/1981 | Kaneko et al. | 360/98 |
| 4,405,136 | 9/1983 | Elsing et al. | 360/97 X |
| 4,556,969 | 12/1985 | Treseder et al. | 360/97 X |

FOREIGN PATENT DOCUMENTS

| 0054665 | 6/1982 | European Pat. Off. |
| 2737333 | 3/1979 | Fed. Rep. of Germany |
| 58-102364 | 6/1983 | Japan |
| 2092834 | 12/1982 | United Kingdom |
| 2107107 | 4/1983 | United Kingdom |

OTHER PUBLICATIONS

Japan Patent Abstracts, vol. 7, No. 206 (p. 222) (1351), Sep. 10, 1983, 58-102364.
Kaneko et al, "Compact, . . . Disk Storage", 2254 Japan Telecommunications Review, vol. 24, No. 2, Apr. 1982, pp. 163–169.
Max et al, "Manufacturing a Magnetic Record Carrier", IBM Tech. Disc. Bull., vol. 13, No. 6, Nov. 1970, p. 1559.

*Primary Examiner*—John H. Wolff
*Attorney, Agent, or Firm*—Hill, Van Santen, Steadman & Simpson

[57] ABSTRACT

A housing for a magnetic disk memory comprises a support shell and a cover for housing a magnetic disk pack and a rotational positioner. The disk pack is provided with two bearing locations one of which is secured to one lateral wall of the support shell and the other of which is defined by a slot open toward the edge of the supporting shell in an opposite lateral wall for receiving a disk pack bearing bushing. A seal is provided between the support shell and the cover for a dust-free seal of the interior of the housing, the seal being a closed sealing ring which is pinched at the parting plane between the support shell and the cover. The seal comprises a perpendicularly projecting semi-circular extension in the region of the slot—which encompasses the bearing bushing and is fixed to the exterior of the lateral wall in a recess formed therein.

7 Claims, 3 Drawing Figures

DIVIDED HOUSING FOR A MAGNETIC DISK DRIVE COMPRISING A PERIPHERAL SEALING RING

CROSS REFERENCE TO RELATED APPLICATIONS

This application is related to the following applications
Ser. No. 696,203, filed Jan. 29, 1985
Ser. No. 696,202, filed Jan. 29, 1985
Ser. No. 696,184, filed Jan. 29, 1985
Ser. No. 696,205, filed Jan. 29, 1985
Ser. No. 696,207, filed Jan. 29, 1985.

BACKGROUND OF THE INVENTION

1. Field of the Invention

The present invention relates to a housing for a magnetic disk drive of the type which is subdivided into a cover and into a supporting shell in which a disk pack is seated rotatably at both ends and in which a magnetic head positioner device is disposed, whereby a seal between the supporting shell and the cover provides a dust-free sealing of the housing interior and whereby one of the bearings for the disk pack in a lateral wall of the supporting shell is designed as a slot open toward the edge of the supporting shell for receiving a corresponding disk pack bearing.

2. Description of the Prior Art

Technical development in magnetic disk drives continues to constantly work towards higher and higher storage capacities, both with respect to the track density and the bit density as characteristic for the storage capacity per disk surface, on the one hand, and with respect to the mechanical structure, on the other hand, in order to accommodate as many magnetic disks as possible in a prescribed mounting space. An example of this is the so-called 5¼" fixed disk memory whose magnetic disks have an outer diameter of 130 mm and an inner diameter of 40 mm according to the German Industrial Standard. Analogous to the dimensions of the competing floppy disk drives, a mounting space having a mounting height of 82.5 mm and a base area of 146 mm×203 mm has crystallized as a standard unit size for this type of memory, being available for the entire device including the housing and the appertaining electronics.

In the desire to accommodate as many magnetic disks as possible in this prescribed mounting space, the drive motor for the disk pack has been successfully miniaturized to such a degree that it can be built into the hub of the disk pack. With the useable mounting height thereby gained, disk packs which contain up to eight magnetic disks stacked on top of one another have become possible based on the current conditions in the size of the combined magnetic heads and the disk thickness. The remaining mounting height is required for the housing and the device electronics.

The desired compact structure and the desired high recording density on the magnetic disks produce special structural measures in order to achieve justifiable manufacturing costs given sufficient operating reliability, but also to achieve a desired accessibility of the disk pack and of the appertaining magnetic head positioner upon assembly and in a test mode.

To this end, the housing of the magnetic disk drive in the present case is divided along a parting plane parallel to the central axis of the disk pack and of the magnetic head positioner, being divided into a tub-like supporting shell and a cover such that both bearing locations for the disk pack lie just within the lateral walls of the supporting shell. However, in order to maintain the mounting depth of the magnetic head positioner into the supporting shell as small as possible, the parting plane is inclined at an angle relative to the end wall of the supporting shell. The magnetic head positioner, which is designed as a rotational positioner, is secured to the inside of the wall of the supporting shell and is mounted in the housing as a completely tested module. The same is true of the disk pack. In order to enable the foregoing, a slot open up to the edge of the supporting shell is provided in one of the lateral walls and the allocated spindle peg of the disk pack is received in the slot during assembly. The other spindle peg is fixed at the opposite end wall of the supporting shell by a screw connection which extends through the housing wall.

The structural format enables a step-by-step assembly of the modules and, assuming a dust-free environment, allows a test mode of the magnetic disk drive, even given a removed cover, and simultaneously allows a far-reaching accessibility of the individual modules in this condition.

The operating reliability of magnetic disk drives also largely depends on the hermetic seal of the housing interior in which the disk pack rotates from disturbing influences of the environment. Due to the sensitivity of the surface of the magnetic disks and particularly to the slight spacings at which the magnetic heads of the rotational positioner fly above the surfaces of the allocated magnetic disks during operation, it is, absolutely necessary that any and all influence of dust from the exterior be avoided.

SUMMARY OF THE INVENTION

The present invention is therefore based on a main object of providing a housing structure with a faultless housing seal in the parting plane between the supporting shell and the cover, given a low expense in terms of production engineering. It is thereby particularly essential that the bearing location designed in the manner of a slot in the one lateral wall of the supporting shell be incorporated into the seal such that any loss of tightness is avoided insofar as possible.

Given the housing for a magnetic disk drive of the type generally set forth above, the above object is achieved, according to the present invention, in such a housing which is characterized in that the seal is fashioned as a closed sealing ring pinched in the parting plane between the supporting shell and the cover and comprises an angled-off projection semicircular in shape in the region of the slot, which projection, encompassing the disk pack bearing, is fixed to the exterior of the lateral wall of the supporting shell.

The above solution has the special advantage that, in particular, the critical region at the slot-like bearing location of the disk pack which interrupts the closed parting plane in and of itself is also covered without sealing losses. In other words, the housing is reliably sealed with a one-piece seal being effective in two planes and around the edge lying in the intersection of these planes. This peripheral seal is preferably manufactured of silicone plastic as an injection molded formed part. On the one hand, the properties of this material, a high material constancy in addition to the desired elasticity in this case, are thereby exploited. Great value is placed on the former feature in the present case in order to avoid having the seal material itself carry contaminants into the interior of the housing. The manufacturing method, on the other hand, guarantees that the break or yield line at the intersection to the peripheral extent is designed to be clean and sharp-edged. Precisely such a shaping, however, is necessary in order to create an unequivocal seal in the one lateral wall of the supporting shell in the region of the opening of the slot.

In accordance with another feature of the invention, the sealing surface in the parting plane between the cover and the supporting shell is designed as a step, whereby a metallic contact between the cover and the supporting shell for shielding high-frequency noise signals is provided by an inwardly-disposed shoulder and an outwardly-disposed groove for receiving the sealing ring are provided. This design of the sealing surface simultaneously meets two requirements, namely the mechanical sealing and the electrical shielding of the interior of the housing.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
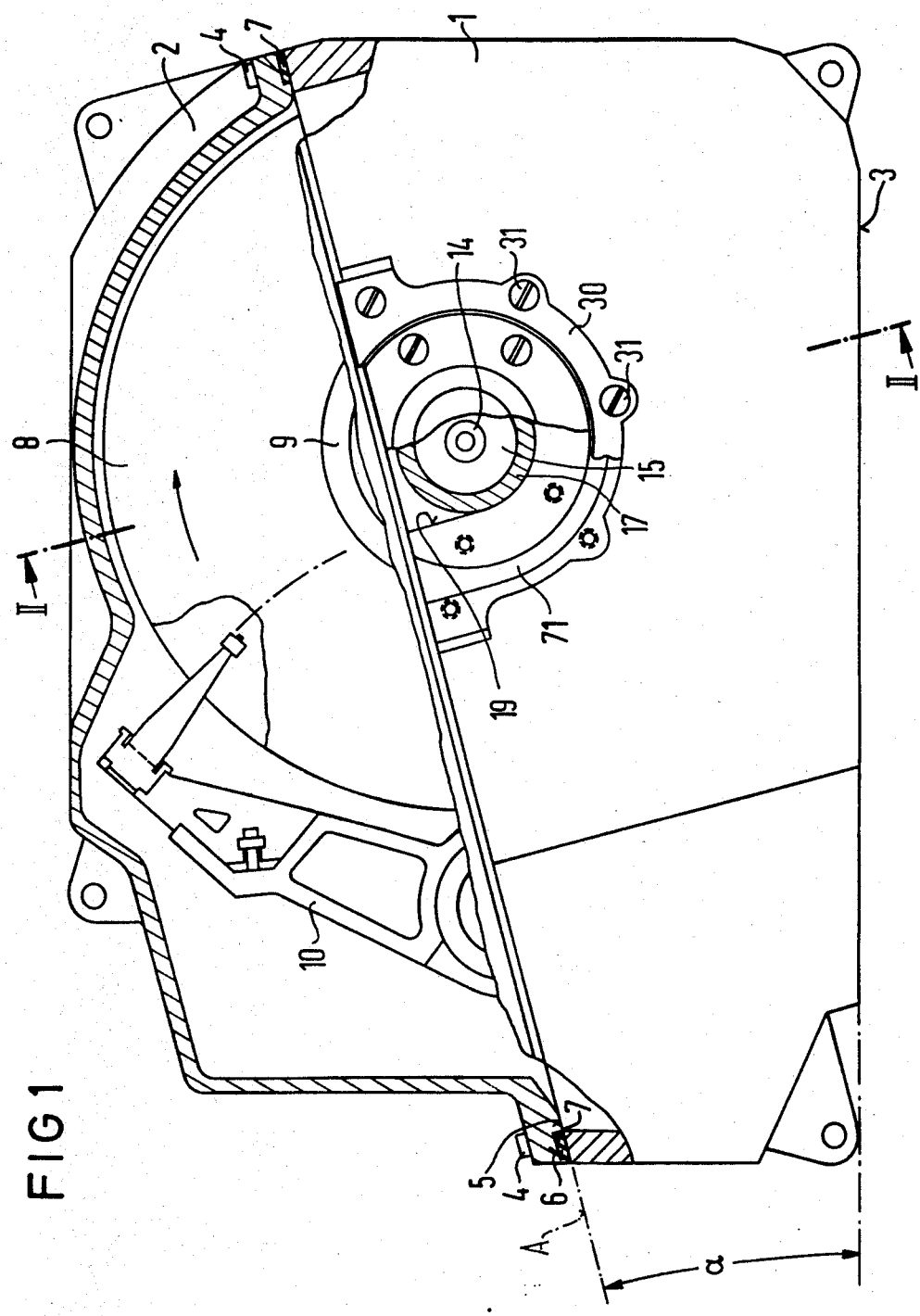
FIG. 1 is an elevational view of a housing for a magnetic disk drive comprising a tub-shaped supporting shell which receives the magnetic disk pack and comprising a cover in place thereon which is shown partially cut away in order to show a circumnavigant seal in the parting plane between the supporting shell and the cover.
Figure 2:
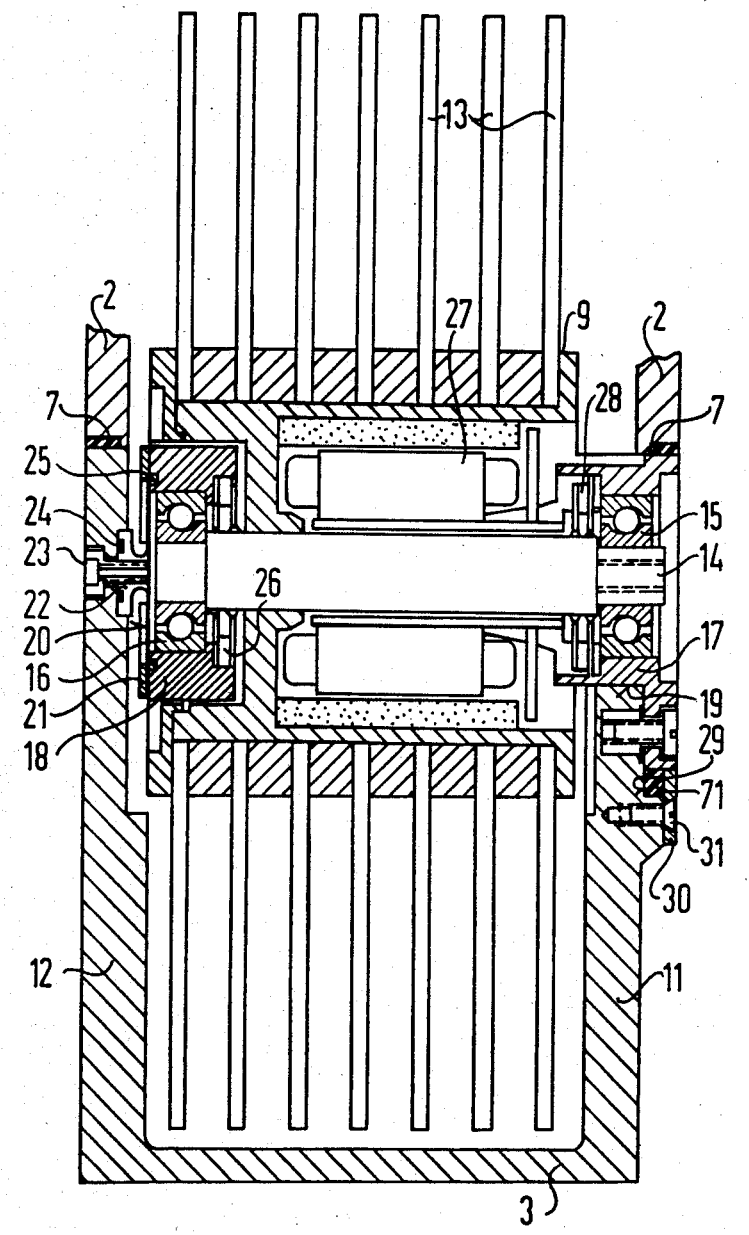
FIG. 2 is a sectional view through the housing of FIG. 1 taken substantially along the parting line II—II of FIG. 1.

FIG. 1 illustrates a housing which is subdivided along a diagonally extending parting plane A into a supporting shell 1 and a cover 2 and FIG. 2 illustrates a corresponding section through the housing. Both figures shall therefore be explained below in common.

The housing itself is an essentially rectangular box whose bearing element is the supporting shell 1. The cover 2 being seated in the parting plane A which is inclined relative to an end wall 3 of the supporting shell by an angle α, is mounted on the supporting shell and releasably connected thereto by screws. The connection between the cover and the supporting shell should be dust-tight and should create an adequate shielding from high-frequency noise signals at the same time. To this end, the cover 2 has an edge which lies in the parting plane A and is designed as a step. A planar metal contact surface which lies directly against the edge of the supporting shell 1 is created with an inwardly-disposed projecting shoulder 5. As a result of the shoulder 5, an outwardly-disposed bezel 6 derives in the edge of the cover 2, and a peripheral seal 7 is inserted into the bezel. When the cover 2 is screwed to the supporting shell 1, the shoulder 5 is applied to the edge of the supporting shell 1 and thus sees to the high-frequency shielding; at the same time, the sealing ring 7 is pinched in the groove formed by the edge of the supporting shell 1 and the bezel 6 and the desired dust-free seal is achieved.

The cover 2 is shown partially cut in FIG. 1 in order to illustrate the described solution of the sealing problem and to show the interior of the magnetic disk drive and, therefore, its essential structural parts. Visible as a result of the partial section is a disk pack 8 which, as schematically indicated, is disposed on a hub 9 and rotates in the direction of the arrow (FIG. 1). A rotational positioner 10 shown in the operating position is disposed laterally adjacent to the disk pack as a magnetic head positioner device.

The partial section selected in FIG. 1 also shows the significance of the selected position and inclination of the parting plane A. The parting plane A is located such that all structurally-essential housing functions are united in the supporting shell 1, this particularly applying to the two-sided bearing of the disk pack 8 but also applying to the fastening of the rotational positioner 10, on the one hand. On the other hand, the parting plane A is located as close to and parallel to the central axis of the disk pack 8 and is inclined by the angle α so that the mounting depth for the rotational positioner 10 is optimized in view of manufacture and assembly. Good accessibility of the function-defining component parts of the magnetic disk drive is achieved with the structural principle and the selected housing division.

This shall now be specifically explained in detail with reference to the sectional view through the housing illustrated in FIG. 2. For reasons of clarity, this section has been enlarged in scale and particularly emphasizes the structure of the disk pack 8 with the two-sided bearing in the lateral walls of the supporting shell 1.

FIG. 2 illustrates the tub-like shape of the supporting shell 1 comprising two lateral walls extending perpendicular to the end wall 3 and constituting a base 11 of the supporting shell and a top 12 of the supporting shell. These designations point out that the actual mounting position of a magnetic disk drive corresponds to the broad side of the section illustrated in FIG. 2.

One bearing location for the disk pack 8 lies in each of the lateral walls. In the present example, the disk pack is considered a completely preassembled unit and it therefore is unnecessary to explain its structural format in terms of all of its details. It should be merely pointed out by way of summary, that a plurality of storage disks 13 are chucked to the hub 9 of the disk pack at equal intervals. The hub 9 is designed to the hollow member and is rigidly connected as a spindle 14 which comprises spindle pegs at both ends which carry ball bearings 15 and 16, with interference fits. A respective bearing bushing 17, 18 is pressed onto the outer rings of these ball bearings with interference fits.

As a seating surface for the first bearing bushing 17, the base 11 of the supporting shell comprises a slot 19 extending perpendicular to the edge of the supporting shell 1 and opened toward this edge, the inwardly directed floor or bottom of the slot being executed as a 180° curvature. The first bearing bushing 17 allocated to this bearing location accordingly has just such a centering surface and is cut off parallel to the edge of the supporting shell 1.

The second bearing bushing 18 disposed at the opposite side of the disk pack 8 carries a membrane spring 20 at its outwardly-directed end face, the membrane spring being inserted into a centering shoulder in the end face of the bearing bushing 18 and being non-positively fixed to the end face of the bearing bushing with the assistance of a thrust collar 21. The resilient member of the membrane spring 20 is composed of a round spring disk which carries a centrally-disposed, outwardly-directed end plate 22 which has a central bore. The end plate 22 is fixed to the inside wall of the housing with the assistance of a fastening screw 23 inserted from the exterior into a coaxial bore in the top wall of the supporting shell. A sealing washer 24, which is inserted between the end plate 22 and the inside of the housing, is provided for sealing this bearing location.

In order to avoid having contaminants deriving from the ball bearing 16 proceed into the interior of the housing, there are provided a further seal 25 inserted between the membrane spring 20 and the second bearing bushing 18 and a magnetic fluid seal 26 disposed adjacent to the ball bearing at the inside end of the second bearing bushing 18.

An internal drive motor 27 for the drive of the disk pack 8 is disposed in the hollow member of the hub 9, the motor has its stator fixed to the inside end of the first bearing bushing 17. Immediately adjacent to the first ball bearing 15, a second magnetic fluid seal 28 is likewise fixed in this first bearing bushing 17 and seals the bearing location toward the inside. A direct sealing of the ball bearing at the outwardly-directed side is not necessary since the bearing location here is conducted through the base 11 of the supporting shell.

However, the sole metallic seal between the first bearing bushing and the wall of the slot 19 of the base 11 of the supporting shell does not suffice in order to reliably create a dust-free seal in the region of this bearing location. As may best be seen from FIG. 2, a recessed portion 29 has been provided for this reason in the outer surface of the base 11 of the supporting shell concentric to the circumference of the first bearing bushing 17, and a lateral projection 71 of the sealing ring 7 is inserted into the recessed portion 29, as also seen in FIG. 1.

Figure 3:
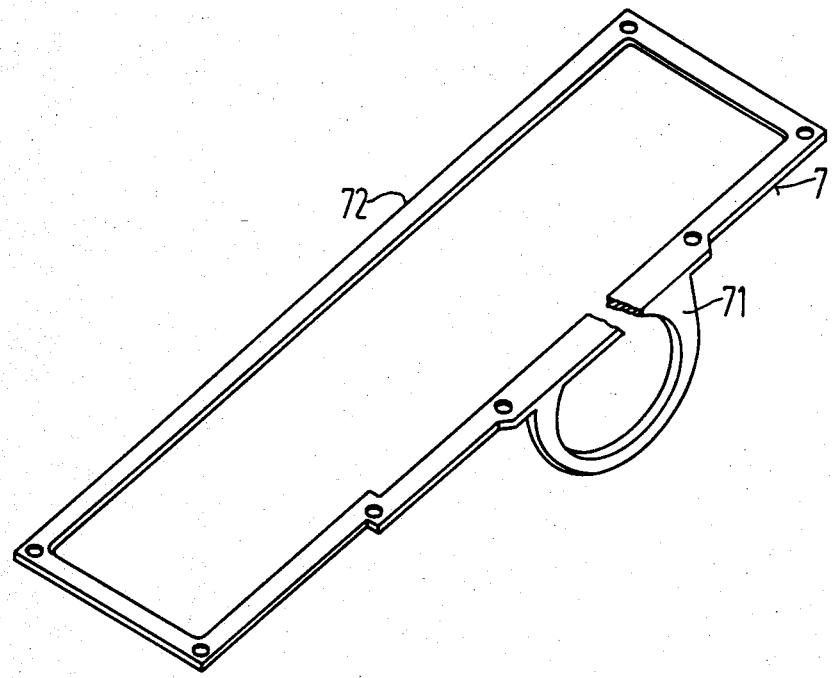
FIG. 3 is a perspective view of the circumnavigant seal between the supporting shell and the cover of the housing of FIG. 1 illustrated as a discrete part.

Since FIGS. 1 and 2 do not show the actual shape of the sealing ring 7 with the projecting portion 71 extending therefrom at right angles with sufficient clarity, it has again been shown as a discrete element in a perspective view in FIG. 3. The ring 7 which is pinched between the supporting shell and the cover 2 and which extends about these elements in the parting plane A in its built-in condition can be clearly seen from FIG. 3. The extension of projection 71 is at a right angle. This sealing element acting in two planes is manufactured as an injection molded part, being preferably manufactured of silicon plastic. The manufacturing method enables an accurate shaping which, in particular, permits a precise, sharp angle in the region of the right-angle departure between the peripheral ring 70 and the projection 71, the angle guaranteeing a reliable, dustfree seal along this right-angle line in terms of function. The selection of the seal material is essentially defined by two requirements, namely the seal material should remain invariably elastic and free of decomposition over a long period of time. It is particularly the latter feature that is of significance here so that the seal material itself does not produce any contamination.

Returning for a moment to the illustrations of FIGS. 1 and 2, it may be seen that the projection portion 71 of the sealing ring 7 inserted into the turn-down portion 21 seals the circumferential surface of the first bearing bushing 17 in a dust-free manner relative to the proximate sealing surface in the base 11 of the supporting shell under the influence of a contact pressure element 30 which is in place from the exterior onto the base 11 of the supporting shell concentrically relative to the spindle axis and is fixed to the base 11 by way of fastening screws 31.

Although we have described our invention by reference to a particular illustrative embodiment thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a housing for a magnetic disk drive in which the housing is formed of a support shell and a cover each having a peripheral edge for mating with the peripheral edge of the other at a parting plane and in which the support shell has a pair of parallel lateral walls each connected to a respective one of a pair of end bearing of a magnetic disk pack, and in which one of the lateral walls includes a slot opening through the peripheral edge of the support shell for receiving one of said bearing means, the improvement therein comprising:

a sealing ring disposed between said peripheral edges, said sealing ring comprising a first portion shaped complementary to the peripheral edges of the support shell and the cover and mounted therebetween and an annular second portion extending generally perpedicular to said first portion for embracing said one of the bearing means which is disposed in the slot; and means for securing said annular second portion to said one of the lateral walls.

2. The improved housing of claim 1, wherein: said sealing ring comprises silicon plastic.

3. The improved housing of claim 1, wherein:
the support shell and the cover are metal; and
the peripheral edge of said cover comprises means defining a peripheral recess and a periphral projection adjacent thereto all around the peripheral edge of the cover,
said first portion of said sealing ring received in said recess to provide a dust-free seal and said peripheral projection engaging the peripheral edge of said support shell to provide a high-frequency shield when the cover and the support shell are mated.

4. A magnetic disk drive comprising:
a magnetic disk pack including a spindle and first and second ball bearings at opposite ends of said spindle and first and second bearing bushings respectively carrying said first and second ball bearings;
a support shell including an end wall and first and second lateral walls extending perpendicular to said end wall and pair of sidewalls extending perpendicular to said end wall; said lateral walls and said sidewalls defining a support shell peripheral edge;
a cover including a cover peripheral edge for mating with said support shell peripheral edge, said cover comprising means defining a peripheral recess in said cover peripheral edge;
opening means defining an opening in said first lateral wall, said opening receiving said first bearing bushing, and mounting means mounting said second bearing bushing to said second lateral wall;

means defining an annular recess in the outer surface of said first lateral wall about and communicating with said first opening;

a sealing ring comprising a first portion received in said recess of said cover peripheral edge for providing a dust-free seal and a ring-shaped second portion received in said annular recess of said first bearing bushing; and means for securing said ring-shaped second portion in the annular recess.

5. The magnetic disk drive of claim 4, and further comprising:

a further seal mounted about said spindle within said first bearing bushing on the side of said first ball bearing facing the interior of said support shell.

6. The magnetic disk drive of claim 5, wherein:
said further seal is a magnetic fluid seal.

7. The magnetic disk drive of claim 4, wherein:
said means for securing said ring-shaped second portion of said sealing ring comprises a contact pressure element covering said second portion and a plurality of screws securing said contact pressure element to said first lateral wall.

* * * * *